United States Patent [19]

Agrawal et al.

[11] Patent Number: 5,017,927
[45] Date of Patent: May 21, 1991

[54] MONOPULSE PHASED ARRAY ANTENNA WITH PLURAL TRANSMIT-RECEIVE MODULE PHASE SHIFTERS

[75] Inventors: Ashok K. Agrawal; Norman R. Landry, both of Mount Laurel, N.J.

[73] Assignee: General Electric Company, Morrestown, N.J.

[21] Appl. No.: 481,415

[22] Filed: Feb. 20, 1990

[51] Int. Cl.⁵ .................... H01Q 3/22; G01S 13/44
[52] U.S. Cl. .................................. 342/371; 342/154
[58] Field of Search ............. 342/368, 371, 154, 157, 342/158, 374, 372, 373

[56] References Cited

U.S. PATENT DOCUMENTS

| | | | |
|---|---|---|---|
| 3,680,109 | 7/1972 | Steudel | 342/371 |
| 4,160,975 | 7/1979 | Steudel | 342/81 |
| 4,176,359 | 11/1979 | Fassett et al. | 342/153 |
| 4,191,960 | 3/1980 | Lopez | 342/372 |
| 4,246,585 | 1/1981 | Mailloux | 342/373 |
| 4,277,787 | 7/1981 | King | 342/371 |
| 4,532,519 | 7/1985 | Rudish | 342/372 |
| 4,555,706 | 11/1985 | Haupt | 342/379 |
| 4,607,259 | 8/1986 | Dragone | 343/758 |
| 4,616,230 | 10/1986 | Antonucci et al. | 342/373 |
| 4,633,256 | 12/1986 | Chadwick | 342/368 |
| 4,721,960 | 1/1988 | Lait | 342/368 |
| 4,766,438 | 8/1988 | Tang | 342/372 |
| 4,792,805 | 12/1988 | Miglia | 342/372 |
| 4,837,580 | 6/1989 | Frazita | 342/374 |
| 4,866,449 | 9/1989 | Gaffney | 342/151 |

*Primary Examiner*—Gregory C. Issing
*Attorney, Agent, or Firm*—William H. Meise

[57] ABSTRACT

A monopulse antenna array arrangement includes a transmit-receive processor (TR Proc) associated with each antenna element. Each TR Proc has a port associated with the radiating element and at least two further ports, one for a sum beamformer and another for a difference beamformer. Within each TR Proc, a switching arrangement allows transmitter signal to flow through a phase shifter and transmit amp during transmission, and allows received signal to flow through a low-noise amp and the same phase shifter on reception. Each TR Proc includes a coupling arrangement with a second phase shifter and a second output port, adapted to be coupled to a difference beamformer during reception.

4 Claims, 7 Drawing Sheets

MONOPULSE PHASED ARRAY ANTENNA WITH PLURAL TRANSMIT-RECEIVE MODULE PHASE SHIFTERS

BACKGROUND OF THE INVENTION

This invention relates to phased array antennas for generation of multiple beams by the use of beamformers, and particularly to such phased array antennas in which each element of the array is associated with a transmit-receive module.

Radar systems often use monopulse techniques to derive angle tracking information from a single echo pulse. This is accomplished by generating two, or more usually three, antenna beams, so that the simultaneously received echoes from the multiple beams can be compared. A phased-array antenna which generates three simultaneous beams in order to support monopulse operation requires a separate beamformer for each of the three beams.

High performance phased array monopulse antennas in current use may have several thousand elemental antennas or antenna elements in the array. A beamformer for use with such an antenna array must therefore include several thousand inputs, and may require different amplitude weighting for signals applied to each input, which amplitude weighting may change depending upon operating conditions. The amplitude weighting is provided in order to control the sidelobe performance of the beam or beams.

Those skilled in the antenna arts know that transmission and reception by antennas are reciprocal operations, and that the operation of antennas is similar in both operating modes. However, descriptions of antenna operation are usually couched in terms of either transmission or reception, with the other mode of operation being understood.

Several thousand inputs of each beamformer of a large phased array antenna must be phase controlled in order to control the beam direction of the antenna array. The interconnections within the beamformer, which lie between the antenna and the common output port of the beamformer, must be carefully phase controlled so as not to introduce errors. When three such beamformers are used, one to produce a sum ($\Sigma$), azimuth difference (AZ $\Delta$) and elevation difference (EL $\Delta$) beams, the errors due to the beamformers must track closely enough so that desired performance is achieved under all operating conditions.

U.S Pat. No. 4,866,449 issued Sept. 12, 1989 in the name of Gaffney describes a scheme for testing a monopulse system and for processing detected signals in such a manner as to correct for time delay differences. The magnitude of the corrections required to be made by such a scheme would be reduced if the errors attributable to the beamformers were reduced.

FIG. 1 is a simplified block diagram of a prior art monopulse radar system. In FIG. 1, radar system 10 includes an antenna array 12 including individual antennas or antenna elements $14^1$, $14^2$, $14^3$, ...$14^{N-2}$, $14^{N-1}$, and $124^N$ arrayed in a column designated $16^1$. Other columns $16^2$, $16^3$....$16^N$ are illustrated in a general manner as being located behind column $16^1$, so as to form a two-dimensional rectangular array of antenna elements.

Each antenna element $14^1$, $14^2$...$14^N$ of columns $16^1$, $16^2$...$16^N$ of antenna array 12 is associated with a phase shifter 18. For example, elemental antenna $14^1$ of column $16^1$ is associated with a phase shifter $18^1$. Similarly, each of the elemental antennas $14^{22}$, $14^3$...$14^N$ of column $16^1$ are associated with a phase shifter $18^2$, $18^3$...$18^N$. As also illustrated in FIG. 1, phase shifter $18^1$ has an output transmission line (cable) $20^1$ which, together with output cable $20^N$ of phase shifter $18^N$ of column $16^1$, is connected to a sum-and-difference hybrid circuit $22^1$. Each of cables $20^1$ and $20^N$ is connected to a separate input port (input) of hybrid circuit $22^1$. It will be noted that phase shifters $18^1$ and $18^N$ are associated with elemental antennas $14^1$ and $14^N$, the first and last (top and bottom) antenna elements of column $16^1$. Similarly, the output of phase shifter $18^2$ is coupled by way of a cable $20^2$ to a second sum-and-difference hybrid splitter $22^2$, together with the output from phase shifter $18^{N-1}$, coupled by way of a cable $20^{N-1}$. Phase shifter $18^2$ is associated with antenna element $14^2$, the second antenna element, and phase shifter $18^{N-1}$ is associated with penultimate antenna element $14^{N-2}$. A third sum-and-difference hybrid combining arrangement $22^3$ receives inputs from the third antenna element $14^3$ and its phase shifter $18^3$ by way of cable $20^3$, and from antepenultimate antenna element $14^{N-2}$ and its phase shifter $18^{N-2}$ by way of cable $20^{N-2}$, respectively. It can be seen that the outputs of the antenna elements of column $16^1$ and their phase shifters are taken in pairs symmetrically disposed above and below the center of column $16^1$, and the antenna outputs are combined in an array of sum-and-difference hybrids. The combination or array of sum-and-difference hybrids 22 associated with column $16^1$ is designated $24^1$.

Each of the other columns, such as column $16^2$, $16^3$...$16^N$, includes (not illustrated) its own column array of antenna elements 14 and phase shifters 18, each of which is associated with an antenna 14. Each of the other columns is also associated with an array 24 (not illustrated) of sum-and-difference hybrids 22. Only antenna array column $16^N$ is illustrated in FIG. 1 as being connected by cables 20 to its associated sum-and-difference hybrid array $24^N$.

In the arrangement of FIG. 1, the sum output produced at the upper output of hybrid $22^1$ of hybrid array $24^1$, is coupled by way of a cable $26^1$ to an input of a sum combiner or beamformer $30^1$. Similarly, the upper or sum ($\Sigma$) outputs of sum-and-difference hybrids $22^2$ and $22^3$, and all the other hybrids (not illustrated) of hybrid array $24^1$, are coupled by a cable 26 to sum combiner $30^1$, which combines the sum signals, and which couples the combined sum signals to a single output cable $34^1$. Similarly, the difference ($\Delta$) output ports of sum-and-difference hybrids $22^1$, $22^2$, $22^3$,...$22^{n/2}$ of hybrid array $24^1$ of FIG. 1 are each connected by way of a transmission line 28 to separate inputs of a difference combiner or beamformer $32^1$. Thus, the $\Delta$(lower) output port of hybrid $22^1$ is connected by way of a cable $28^1$ to a first input of $\Delta$combiner $32^1$, the a output port of hybrid $22^2$ is coupled by way of a cable $28^2$ to a second input of $\Delta$combiner $32^1$, and the $\Delta$output port of hybrid $22^3$ is coupled by cable $28^3$ to a third input of $\Delta$combiner $32^1$. All the other hybrids (not illustrated) of hybrid array $24^1$ have their $\Delta$output ports coupled to a $\Delta$combiner $32^1$ in a similar manner. Combiner 32' combines the signals and couples their sum to an output cable 36'.

Each of the other hybrid arrays $24^2$...$24^M$ (only $24^M$ illustrated) of FIG. 1 are connected to an associated pair of sum and difference combiners or beamformers in the same manner. The $M^{th}$ hybrid array, namely $24^M$, is illustrated in FIG. 1, together with some of its cables 20, and also with some connection 26 to last column Σ combiner $30^M$.

As so far described, all the columns $16^1$ through $16^M$ ultimately produce a sum signal from a column sum combiner 30 on a cable 34, and a difference signal from a column Δ combiner 32 on a cable 36. Thus, there are M cables 34, and M cables 36, one for each column 16.

Elemental phase shifters 18 can be adjusted so that the input signals to column Σ combiners 30 add in-phase for a desired antenna beam pointing direction. Difference signals to column Δ combiner 32 will add in-phase only if cable pairs $26^N$ and $28^N$ are phase matched for all N, provided that the Σ and Δ combiners for each column have identical topologies.

First cable $34^1$ and last cable $34^M$ from sum combiners $30^1$ and $30^M$, respectively, are coupled to individual inputs of a sum-and-difference hybrid designated $38^1$. The outputs from the second ($30^2$) and penultimate ($30^{M-1}$) combiners (not illustrated) are coupled over cables $34^2$ and $34^{N-1}$ to separate input ports of a second sum-and-difference hybrid $38^2$. Similarly the third ($30^3$) and antepenultimate ($30^{M-2}$) sum combiners 30 (not illustrated) have their outputs coupled by way of cables $34^3$ and $34^{M-2}$, respectively, to a sum-and-difference hybrid $38^3$. Other sum-and-difference hybrids (not illustrated) together with hybrids $38^1$, $38^2$, and $38^3$, form an array $40^M$ of sum-and-difference hybrids. Each hybrid of array $40^M$ receives inputs from a pair of column sum combiners 30 associated with a pair of columns 16, the columns of which are symmetrically disposed to the left and right of the center of array 12.

The sum outputs of the hybrids of hybrid array $40^M$ of FIG. 1 are each separately coupled by way of a cable 44 to a separate input of an azimuth sum combiner 48. For example, hybrid $38^1$ has its Σ output connected by way of a cable $44^1$ to an input of azimuth combiner 48, hybrid $38^2$ has its Σ output connected by a cable $44^2$ to another input of azimuth combiner 48, and hybrid $38^3$ has its Σ output connected by way of a cable $44^3$ to a third input of azimuth sum combiner 48. Azimuth sum combiner combines the Σ signals and produces the combined Σ signal on a cable 50 for application to a processing and display unit illustrated as 70.

The Δ outputs of each of sum-and-difference hybrids 38 of hybrid array 40 of FIG. 1 are each separately coupled by way of a cable 46 to separate inputs of an azimuth Δ combiner 52. For example, the Δ output of hybrid $38^1$ is connected by way of a cable $46^1$ to an input of azimuth Δ combiner 52, the Δ output of hybrid $38^2$ is connected to a second input of azimuth Δcombiner 52 by way of a cable $46^2$, and the Δ output of hybrid $38^3$ is connected by way of a cable $46^3$ to yet another input of combiner 52. Combiner 52 combines the Δ signals and applies the combined signals over a cable 54 to processing and display unit 70 of radar unit 10.

Another array 41 of sum-and-difference hybrids, each of which is designated as 42 in FIG. 1, is coupled to the array of M column Δ combiners 32 (only combiner $32^1$ is illustrated), in much the same fashion that array 40 of hybrids 38 is coupled to an array of M sum combiners 30. For example, sum-and-difference hybrid $42^1$ receives inputs by way of cables $36^1$ and $36^M$ from first and last column Δ combiners $32^1$ and $32^M$ (not illustrated). Sum-and-difference hybrid $42^2$ is connected by way of cable $36^2$ and $36^{M-1}$ to the second and penultimate column Δ combiner 32 (not illustrated), and hybrid $42^3$ has its inputs connected by way of cables $36^3$ and $36^{M-2}$ to the third and antepenultimate column Δ combiners 32. Other hybrids 42 of array 41 are connected to other pairs of combiners symmetrically disposed to the left and right about the center of array 12.

The sum outputs of each of sum-and-difference hybrids 42 of array 41 of FIG. 1 are coupled by way of separate cables 56 to separate inputs of an elevation Δ combiner 62. For example, hybrid $42^1$ has its sum output connected by way of a cable $56^1$ to a first input of combiner 62, and the sum outputs of hybrids $42^2$ and $42^3$ are connected by separate cables $56^2$ and $56^3$, respectively, to other inputs of elevation Δ combiner 62. Elevation Δ combiner 62 combines the column Δ signals to produce an elevation Δ signal on a cable 64 for application to processing and display unit 70.

The difference (Δ) outputs of sum-and-difference hybrids 42 of hybrid array 41 of FIG. 1 are not used and are terminated. For example, the Δ output of hybrid $42^1$ is coupled by way of cable $58^1$ to a termination $60^1$, and the Δ outputs of hybrids $42^2$ and $42^3$ are coupled by cables $58^2$ and $58^3$ to terminations $60^2$ and $60^3$, respectively.

A transmitter 72 associated with radar system 10 of FIG. 1 is coupled to processing and display unit 70 for timing the signals, for providing appropriate demodulation reference signals, and for other purposes. Also, a transmitter signal is applied to cable 50 of azimuth sum combiner 48, as suggested by dotted lines 74 within processing and display unit 70. The transmitter signals are coupled through azimuth combiner 48 and back through the arrays of hybrids and combiners, which in the context of transmission may act as splitters, to ultimately produce signals at antenna elements 14, which signals are phased in a manner appropriate for directing radiation in a particular direction.

The complexity of the beamforming arrangement of FIG. 1 is apparent. Additional complexity arises because of the amplitude weighting of the signals relative to each other in each column 16, and from column to column, in order to achieve the appropriate sidelobe levels for both elevation and azimuth beams. Even if phase shifters 18 are set correctly, assuming equal phase signals arriving at the phase shifters, cumulative phase errors through the combiners and hybrid arrays may adversely affect the performance. In this regard, it should be noted that the actual physical lengths of interconnecting cables such as $20^1$, $20^2$...$20^M$ must be nearly equal for wide bandwidth signals, and some cables such as $26^N$ and $28^N$ must have the same electrical length as well, even though the distances over which the signals must be carried may be less than the physical lengths This in turn tends to create a problem relating to excess cable lengths associated with the shorter paths, which excess cable lengths must be stored out of the way. An improved beamforming arrangement is desired.

SUMMARY OF THE INVENTION

A monopulse antenna array associates each antenna element of the array with a transmit-receive processor. Each processor includes a phase shifter associated with a signal path between the antenna element or radiator and a sum output port of the transmit-receive module. A second phase shifter is associated with a receive-only path extending between that module port which is connected to the radiator and a third port of the module, which third port is adapted to be connected to a difference beamforming arrangement. Some embodiments of the invention include further receive-only paths in each transmit-receive processor.

DESCRIPTION OF THE DRAWING

FIG. 8 represents a possible antenna beam pattern generated by the arrangement of FIG. 7.

DESCRIPTION OF THE INVENTION

Figure 1:
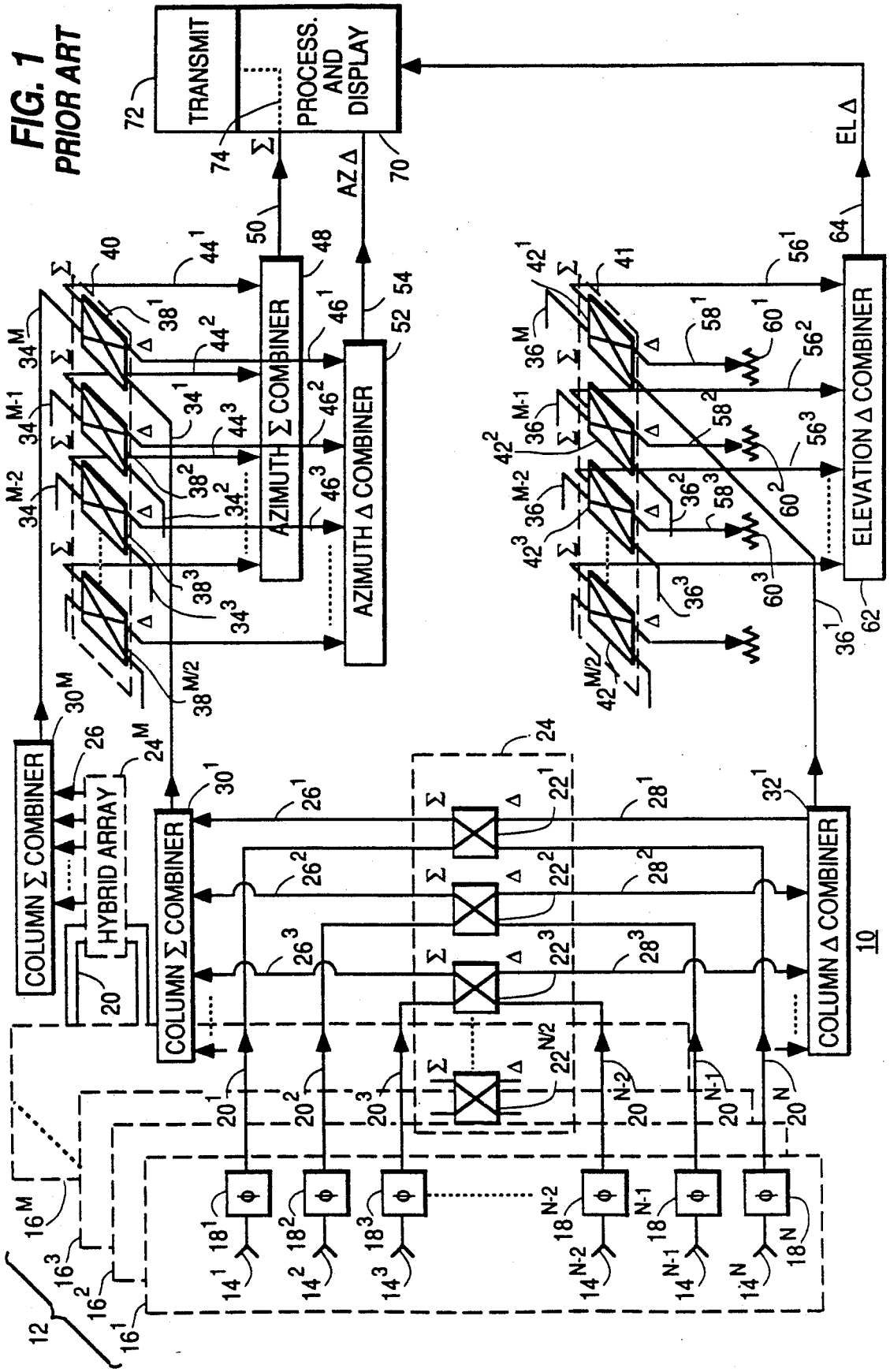
FIG. 1 is a simplified block diagram of a prior art monopulse system using a phased-array antenna, illustrating the use of column sum-and-difference hybrids and combiners, to form column sum ($\Sigma$) and column difference ($\Delta$) information, and the use of further sum-and-difference hybrids and further combiners to form the $\Sigma$, azimuth difference (AZ $\Delta$) and elevation difference (EL $\Delta$) beams.
Figure 2A:
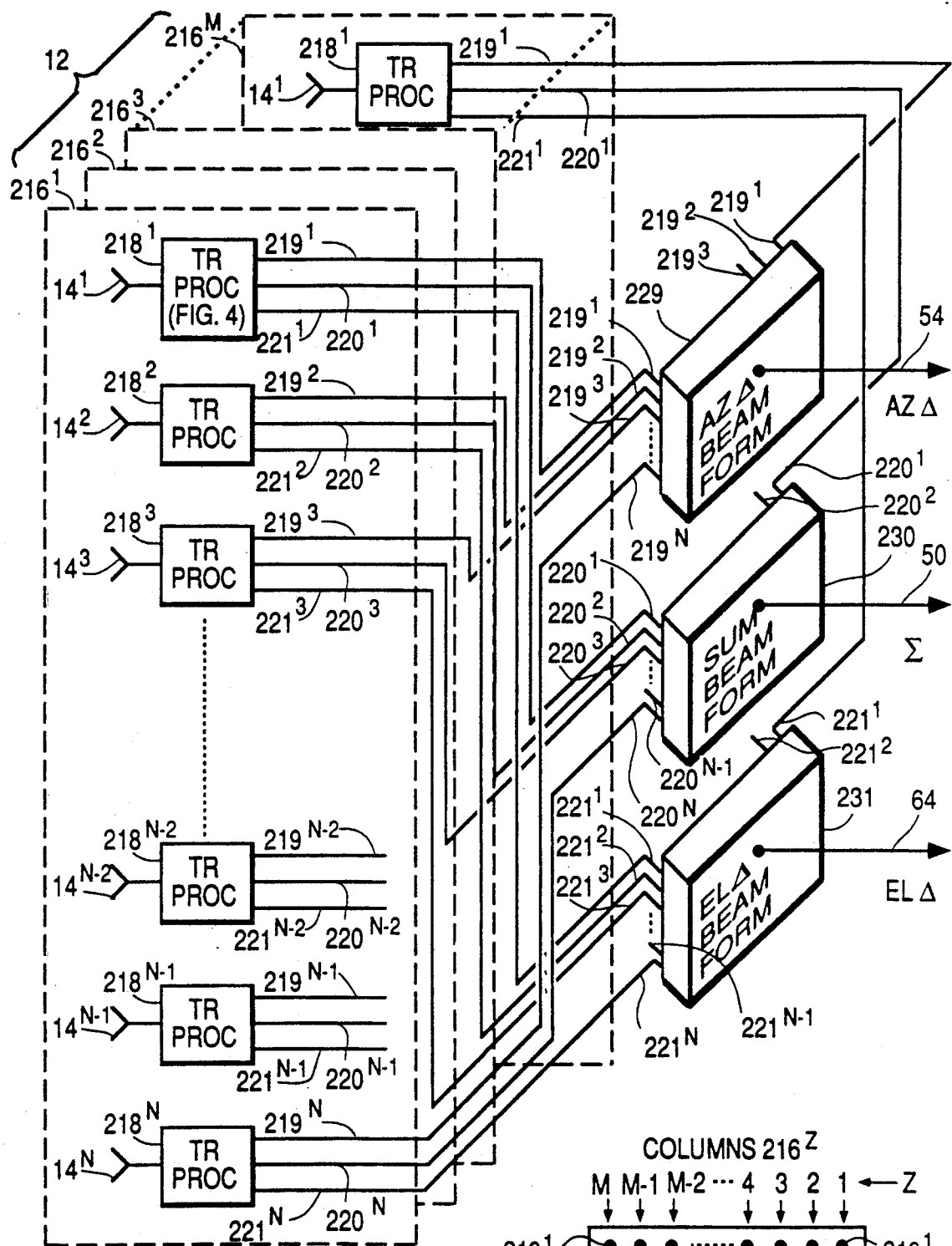
FIG. 2a is a simplified block diagram of a monopulse system according to an aspect of the invention, in which each antenna of the phased-array antenna is associated with a transmit-receive processor (TR Proc) or module, each with plural outputs, which system also includes plural beamformers.

FIG. 2a is a simplified block diagram of a monopulse antenna array arrangement. Elements of FIG. 2a corresponding to those of FIG. 1 are designated by the same reference numerals. Array 12 of FIG. 2a includes a plurality of columns $216^1$, $216^2$, $216^3$...$216^M$, corresponding generally to columns 16 of FIG. 1. Each column 216 of FIG. 2a includes a vertical array of N antenna elements 14, such as $14^1$, $14^2$, $14^3$...$14^{N-2}$, $14^{N-1}$, and $14^N$. Each antenna element 14 of each column 216 is associated with a transmit-receive processor or module (TR Proc). Thus, antenna element $14^1$ of column $216^1$ is associated with a TR Proc $218^1$, elemental antenna $14^2$ is associated with TR Proc $218^2$, and antenna $14^N$ is associated with TR Proc $218^N$. Structurally, all TR Procs 218 are identical, although, as described below, their adjustable portions (phase shifters, attenuations and/or switches) may be set differently.

As illustrated in FIG. 2a, each transmit-receive processor 218 has three outputs, designated 219, 220, and 221. For simplicity, the outputs of the TR processors are designated by the same reference numerals as that of the cables to which they are attached. Thus, outputs $219^1$, $220^1$ and $221^1$ of TR Proc $218^1$ of column $216^1$ are connected to cables $219^1$, $220^1$ and $221^1$, respectively. In a similar manner, the three outputs of TR Proc $218^2$ of column $216^1$ are connected to cables $219^2$, $220^2$ and $221^2$, respectively. The three outputs of TR Proc $218^N$ of column $216^1$ are separately connected to cables $219^N$, $220^N$ and $221^N$. As illustrated in FIG. 2a, the topmost or first TR processor $218^1$ of column $216^2$ is seen to be associated with output cables $219^1$, $220^1$, and $221^1$. In column $216^M$, TR processor $218^1$ is associated with cables $219^1$, $220^1$, and $221^1$. As in the case of FIG. 1, of course, all the columns $216^2$...$216^N$ are identical to column $216^1$.

The arrangement of FIG. 2a includes a $\Sigma$ beamformer 230, an azimuth $\Delta$ beamformer 229, and an elevation $\Delta$ beamformer 231. All the cables 219 connected to TR processors 218 of array 12 are gathered in rows and columns in azimuth $\Delta$ beamformer 229. For example, all the cables $219^1$ from TR processors $218^1$ of all M columns 216 are separately connected to separate inputs located along a top row of beamformer 229. Similarly, all the cables $219^2$ from all the M TR processors $218^2$ of all columns 216 of array 12 are gathered and connected to the second row of inputs (not illustrated in FIG. 2a) of azimuth $\Delta$ beamformer 229.

Figure 2B:
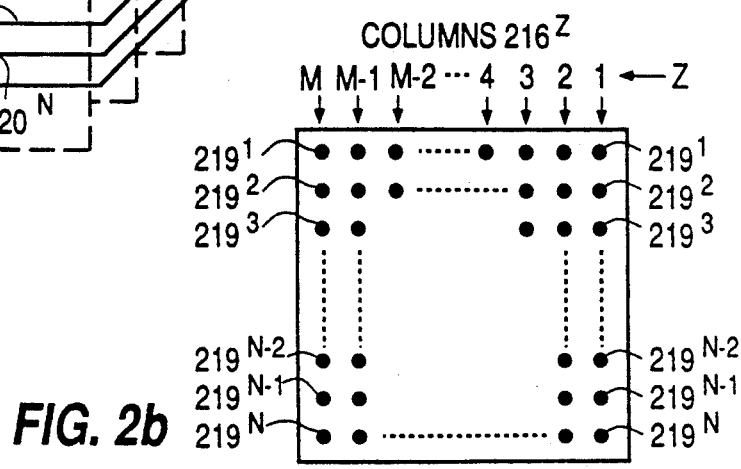
FIG. 2b illustrates some connections on one of the beamformers of FIG. 2a, FIGS. 2a and 2b are referred to together as FIG. 2.

FIG. 2b illustrates the connections of TR processors 218 of FIG. 2a to azimuth $\Delta$ beamformer 229 of FIG. 2a. In FIG. 2b, the connection face of beamformer 229 is seen in elevation view, with some of the inputs illustrated as dots. The connection face of beamformer 229 contains MXN input ports, one for each TR Proc 218, laid out as M columns and N rows. As can be seen, the upper row of inputs of beamformer 229 for columns 1, 2, 3...M−2, M−1, M are each connected to a cable $219^1$. The second row of connections of beamformer 229 is to cables $219^2$, and the bottommost row of connections on the connection face of beamformer 229 receives cables $219^N$.

Sum beamformer 230 of FIG. 2 is connected to receive cables 220 in a same manner in which beamformer 229 is arranged to receive cables 219. That is, the topmost row of the connection face (not illustrated) of sum beamformer 230 is connected to cables $220^1$ from all M columns. The second row is connected to cables $220^2$, and so forth, until the lowermost row is connected to all cables $220^N$ from all M columns Elevation $\Delta$ beamformer 231 is similarly connected to receive cables 221 from all TR Procs 218 of array 12.

Azimuth $\Delta$ beamformer 229 of FIG. 2 collects all the signals provided over cables 219 to form an azimuth difference signal which is coupled out over a cable 54. In the context of a radar system, cable 54 may be connected to a processor and display unit as described in conjunction with FIG. 1. Similarly, sum beamformer 230 and elevation difference beamformer 231 combine the signals from cables 220 and 221, respectively, to produce combined signals on cables 50 and 64, respectively.

Figure 3:
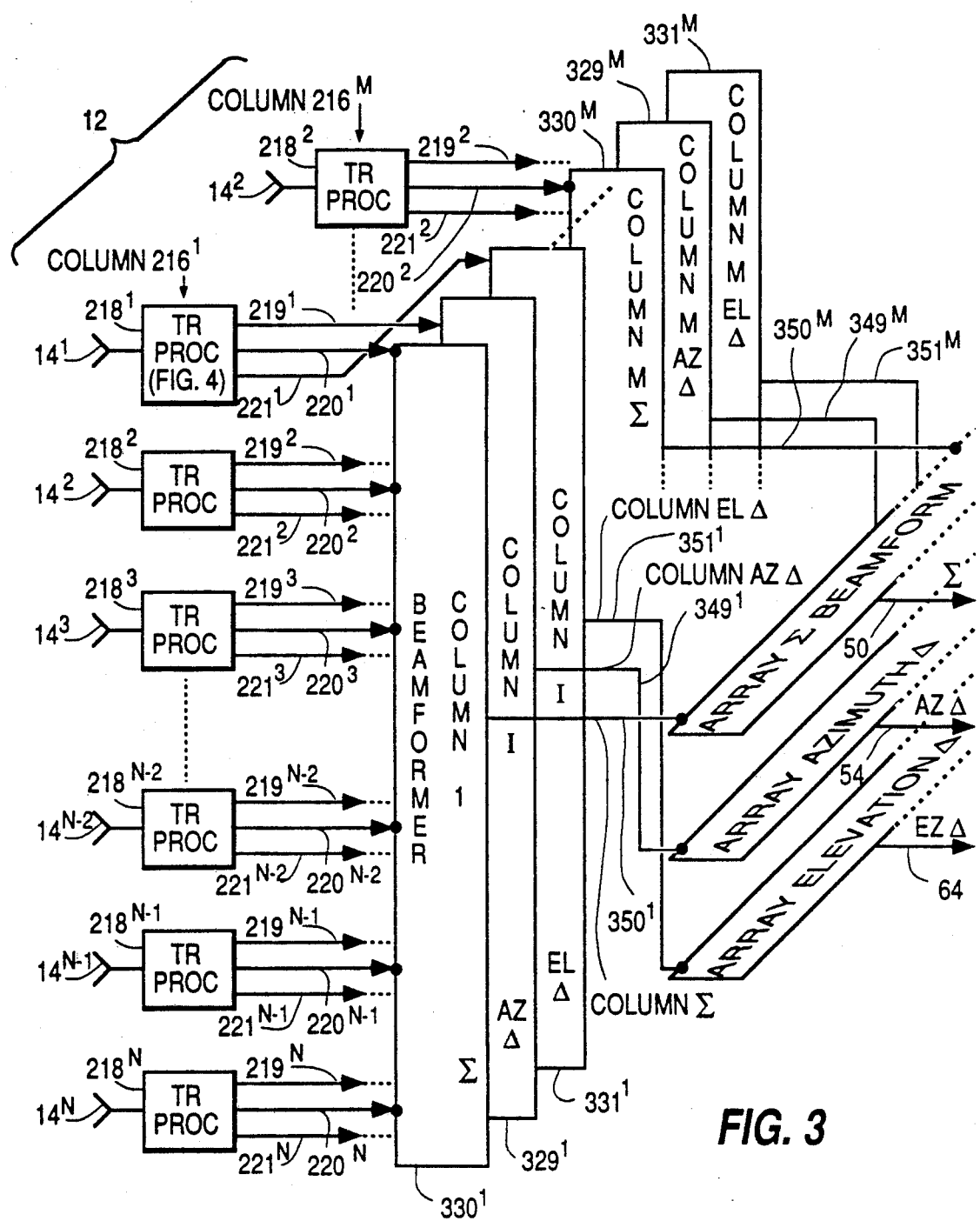
FIG. 3 is a simplified block diagram of the arrangement of FIG. 2, illustrating details of one embodiment of the beamformers.

FIG. 3 illustrates one possible arrangement for interconnecting the transmit-receive processors 218 of the arrangement of FIG. 2. In FIG. 3, elements corresponding to those of FIGS. 1 and 2 are designated by the same reference numerals. In FIG. 3, only column 216 and a portion of column $216^M$ are illustrated. Each column of the array, including columns $216^1$ and $216^M$, is associated with three individual column beamformers designated 329, 330 and 331. In FIG. 3, azimuth $\Delta$ column beamformer $329^1$ is connected to receive cables $219^1$, and all other cables $219^2$, $219^N$ of TR processors $218^2$–$218^N$ of column $216^1$. Column $216^1$ sum beamformer $330^1$ receives inputs from cables $220^1$, $220^2$, $220^2$,...$220^{N-2}$, $220^{N-1}$, and $220^N$. Elevation $\Delta$ column beamformer $331^1$ is connected to receive cable $221^1$ from TR processor $218^1$ of column $216^1$, and cables $221^2...221^N$ from the remaining TR processors 218 of column $216^1$. Thus, column $216^1$, and all other columns 216 of array 12, is associated with three column beamformers, one for sum, one for azimuth Δ and the other for elevation Δ. Thus, cables $220^1, 220^2, 220^3$...connect from TR processors $218^1, 218^2, 218^3$ of column $216^M$ to sum column beamformer $330^M$. Although not illustrated in FIG. 3, column M azimuth difference beamformer $329^M$ is connected to cables $219^1, 219^2$... from the TR processors of column $216^M$, and column M elevation Δ beamformer $331^M$ is connected to cables $221^1, 221^2....221^N$ from the TR processors 218 of column $216^M$.

Each column beamformer $329^1$ –$329^M$ of FIG. 3 produces a signal on an output cable $349^1$ –$349^M$. All cables $349^1...349^M$ are connected to corresponding inputs of an array azimuth Δ beamformer 339, which combines the column signals to produce an array azimuth Δ signal on a cable 54. Similarly, elevation Δ column beamformers $331^1...331^M$ each produce a combined output on a corresponding cable $351^1...351^M$, which are all connected to an array elevation Δ beamformer 341, which combines the signals to produce a combined elevation Δ signal on cable 64. Finally, each sum column beamformer $330^1...330^M$ combines its signals to produce a combined signal on a corresponding cable $350^1...350^M$. All cables $350^1...350^M$ are connected to corresponding inputs of an array sum beamformer 340, which combines the signals to produce a combined sum signal on a cable 50.

Array Σ beamformer 340 of FIG. 3, together with M associated column Σ beamformers 330, may be considered equivalent to sum beamformer 230 of FIG. 2a. Similarly, AZΔ beamformer 229 of FIG. 2a corresponds to the combination of azimuth Δ beamformer 339 of FIG. 3 with a plurality equal to M of column AZΔ beamformers 329. Elevation Δ beamformer 231 of FIG. 2a corresponds to the combination of elevation Δ beamformer 341 of FIG. 3 with all M of the column ELΔ beamformers 331.

Figure 4:
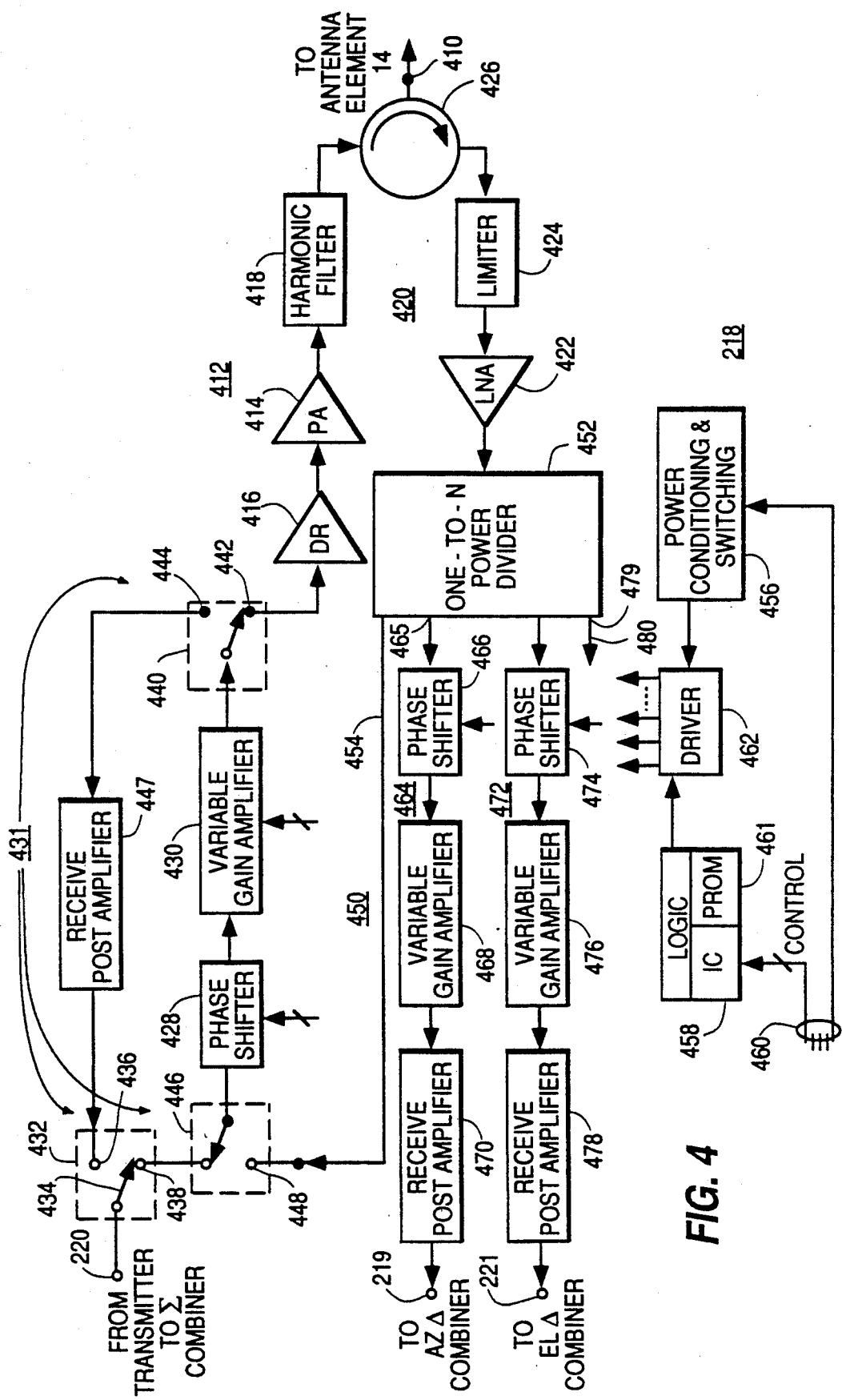
FIG. 4 is a simplified functional block diagram of a transmit-receive module of FIG. 2 or 3 in accordance with an aspect of the invention.

FIG. 4 is a simplified block diagram of a transmit-receive processor 218 which may be used in the arrangements of FIGS. 2 or 3. Elements of FIG. 4 corresponding to those of FIGS. 2 and 3 are designated by the same reference numerals. A port 410 at the right of FIG. 4 is available for connection to the associated antenna element 14. A transmit amplifier designated generally as 412 includes a power amplifier illustrated as 414 and a driver amplifier 416. Broadcasting of harmonics of the transmitted signal is reduced by a harmonic filter 418. Also in FIG. 4, a receive amplifier arrangement designated generally as 420 includes a low noise amplifier (LNA) 422 preceded by an amplitude limiter 424. Transmitted signals are transmitted from transmit amplifier 412 to port 410, and to the associated antenna element 14 (not illustrated) by way of a circulator 426, and signals received by the antenna element are coupled from port 410 to receive amplifier arrangement 420, also by way of circulator 426, which provides isolation between transmit amplifier arrangement 412 and receive amplifier arrangement 420.

A phase shifter 428 has its output connected to a variable gain amplifier 430, which may be used to compensate for changes in the loss of the phase shifter when the phase shifter is controlled to assume various values of phase shift. A switching arrangement designated generally as 431 includes a first switch 432 including a common element illustrated as 434, and also including switch terminals 436 and 438. Mechanical switch symbols are used for purposes of explanation, but those skilled in the art know that solid-state equivalents may provide performance which may be superior. Common element 434 of switch 432 is connected to a port 220, which is the port which is connected to the sum combiners in the arrangements of FIGS. 2 and 3. Switching arrangement 431 includes a second switch 440, which has a common element connected to the output of variable gain amplifier 430, and switch terminals 442 and 444. Switch terminal 442 is connected to the input port of transmit driver 416. A receive post amplifier 447 is connected between switch terminal 444 of switch 440 and switch terminal 436 of switch 432.

A third switch 446 of switching arrangement 431 includes a common element connected to the input port of phase shifter 428, a switch terminal connected to switch terminal 438 of switch 432, and a further terminal 448.

A coupling arrangement designated generally as 450 includes a one-to-N power divider 452, the input of which is coupled to the output of low noise amplifier 422, for dividing the amplified received signal into a plurality of portions. As illustrated in FIG. 4, the number of portions is three. A first portion is coupled by way of a path 454 to switch terminal 448 of switch 446. The other portions are described below.

Each module 218 is also assciated with or contains power conditioning and switching circuits illustrated as 456, and logic circuits illustrated as including an application-specific IC 458 controlled by external commands received from a port 460. Application-specific IC 458 addresses a programmable ROM (PROM) portion 461 of the logic circuit to generate commands for a control driver 462. Control driver 462 in turn commands the operation of switches 432, 440 and 446, the value of the phase shift provided by phase shifter 428, the magnitude of gain provided by variable gain amplifier 430, and other appropriate variable elements (not illustrated).

As so far described, the arrangement of FIG. 4, with the switches in the illustrated positions, is arranged to receive signals to be transmitted at input port 220, to pass those transmitted signals through the selected value of phase shift in phase shifter 428, and to apply the phase shifted signals to transmit amplifier arrangement 412 for amplification and for application through filter 418 and circulator 426 to the associated antenna element 14. The magnitude of the phase shift is selected by control arrangements associated with the control of the entire array, of which a particular module 218 is only a part.

With switches 432, 440, and 446 of FIG. 4 in their alternate positions (not illustrated), signals received by antenna element 14 are coupled by way of port 410 and circulator 426 to limiter 424 and receive amplifier arrangement 420. Amplified received signals are coupled by way of power divider 452 and path 454, through switch 448 to the input of phase shifter 428, where they are phase shifted by the same phase shifter which provided phase shifting in the case of the transmit mode of operation. The phase shifted signals are again attenuated, and coupled by way of switch 440 (in its alternate position), through receive post amplifier 447 and, by way of switch 432 (in its alternate position), to port 220 for transmission therefrom to the sum combiner This arrangement has the distinct advantage of using the Σ combiner, phase shifter 428, and variable gain amplifier 430 for both transmit and receive operations.

According to a further aspect of the invention, the signals coupled to other beamformers, such as azimuth Δ beamformer 229 and elevation Δbeamformer 231 of FIG. 2a, are phase shifted by additional controllable phase shifters independent of phase shifter 428, which is used exclusively for the sum combiner or the sum beamformer. Thus, the value of phase shift provided by phase shifter 428 of FIG. 4 need not be a compromise. In the arrangement of FIG. 4, coupling arrangement 450 includes a further path designated generally as 464 between an output 465 of power divider 452 and a port 219. Path 464 includes a controllable phase shifter 466, a variable gain amplifier 468 and a further receive post amp 470. Variable gain amplifier 468 sets elemental gain for the desired array amplitude taper and resulting side lobe performance, and compensates for amplitude errors attributable to phase shifter 466. Port 219 is connected to the azimuth difference beamformer in the arrangement of FIG. 2. Coupling arrangement 450 also includes a further path designated generally as 472 between another output port 473 of power divider 452 and an output port 221. Path 472 includes a controllable phase shifter 474, an associated variable gain amplifier 476, and a further receive post amp 478. The output of post amplifier 478 is connected to output port 221. Coupling path 450 may include further paths connected to further output ports of power divider 452 for separately phase shifting and level setting signals intended for beamformers associated with monopulse beams other than Σ, AZΔ and ELΔ. Such additional paths are suggested by line 480 connected to an output port 479 of power divider 452.

As so far described, the arrangement of FIG. 2 using a TR module as illustrated and as described in conjunction with FIG. 4 has the salient advantage that the beamformers are not critical, and need not have connections thereto made in matched pairs equidistant from the center lines of the array. Thus, there may be a great saving in cable length and weight, and a reduction in the criticality of the phase through the various paths. Because the system can be tested, the phase shifts of the phase shifters of each TR module can be adjusted to optimize the phase shift through the particular path connected to that output port of that module. The performance in either transmission or reception can therefore be optimized separately for each of the Σ, AZΔ and ElΔ beams, and for any other monopulse beams. Within the beamformers, sums of nearby subarray signals can be made in any order, thereby providing a significant saving in the length and weight of cables. For the difference beams, an extra 180° phase shift can be added to the elemental outputs from selected half arrays. The variable gain amplifiers can be adjusted not only to correct amplitude errors within the beamformer but can provide the amplitude taper required to reduce the sidelobe level. The beamformers can be designed using standardized coupling values rather than coupling values which are customized to provide the desired amplitude weighting. At each operating frequency of the array, the phase shifters and variable gain amplifiers can be programmed with the phase and amplitude required to correct the errors which occur at that particular frequency, thus providing improved antenna performance over that achievable with the prior art arrangement. Accordingly, the limiting factor in the performance of such an array is the ability to measure errors, together with the long-term stability of the equipment.

Figure 5:
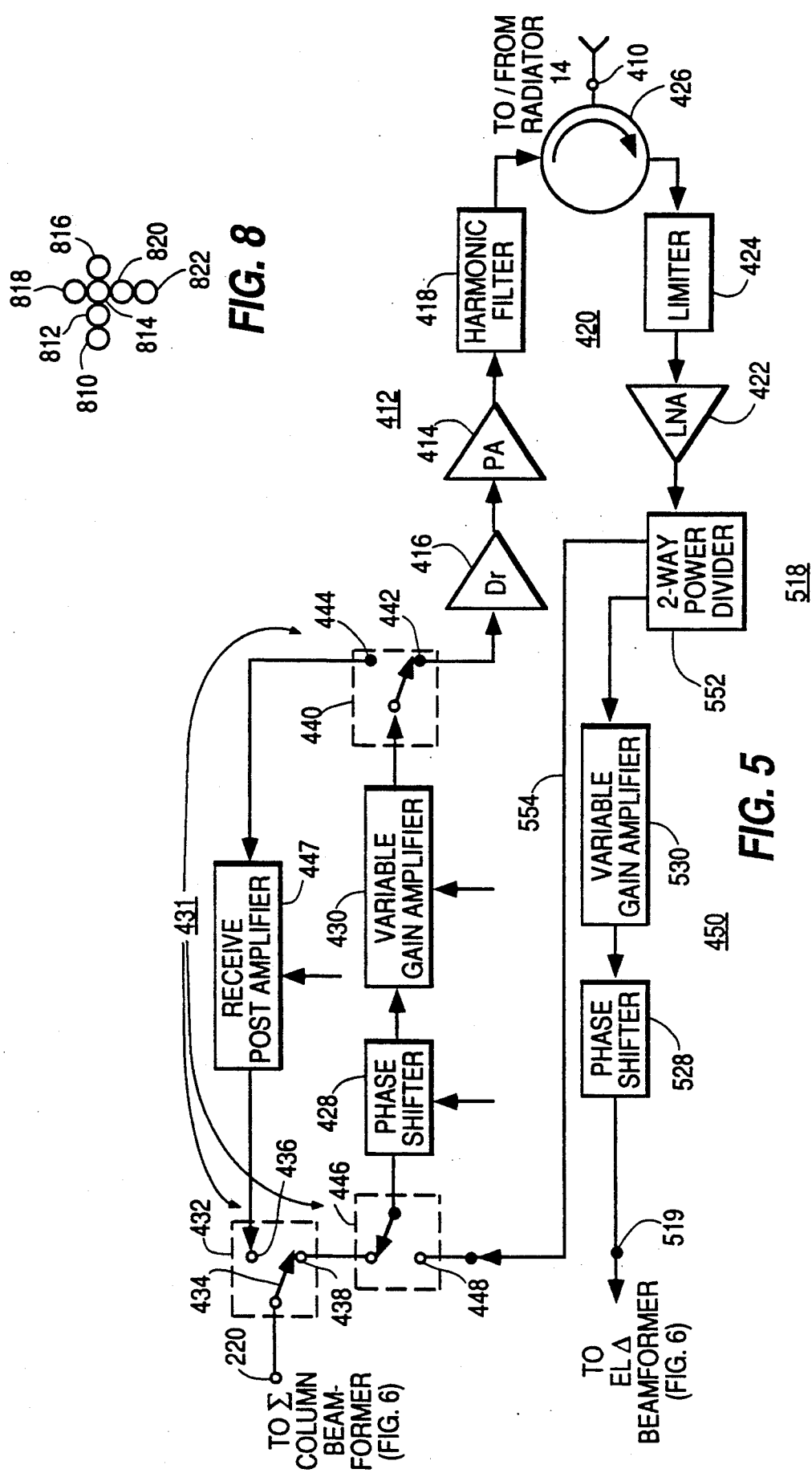
FIG. 5 is a simplified functional block diagram of a transmit-receive module in accordance with another aspect of the invention.

A disadvantage of the arrangement described in conjunction with FIGS. 2, 3 and 4 lies in a number of phase shifters and the complex control which may be required therefor A compromise between the prior-art arrangement of a single phase shifter for multiple beamformers and the arrangement of FIGS. 2 through 4, having a single phase shifter for each beamformer of the array, may be the se of two phase shifters for three beamformers. FIG. 5 illustrates portions of the arrangement of FIG. 4, with a coupling circuit 450 which provides only a single additional phase shifter.

Elements of FIG. 5 corresponding to those of FIG. 4 are designated by the same reference numerals. FIG. 5 differs from FIG. 4 in that low noise amplifier 422 has its output coupled to a two-way power divider 552. One output of power divider 552 is coupled to the cascade of a variable gain amplifier 530 and a controllable phase shifter 528. The output of the cascade is connected to an output port 519 and is available to the difference beamformers. A second output of power divider 552 is coupled by way of a path 554 to terminal 448 of switch 446. This provides a path by which received signals can return to the sum beamformer, as described in conjunction with FIG. 4.

Figure 6:
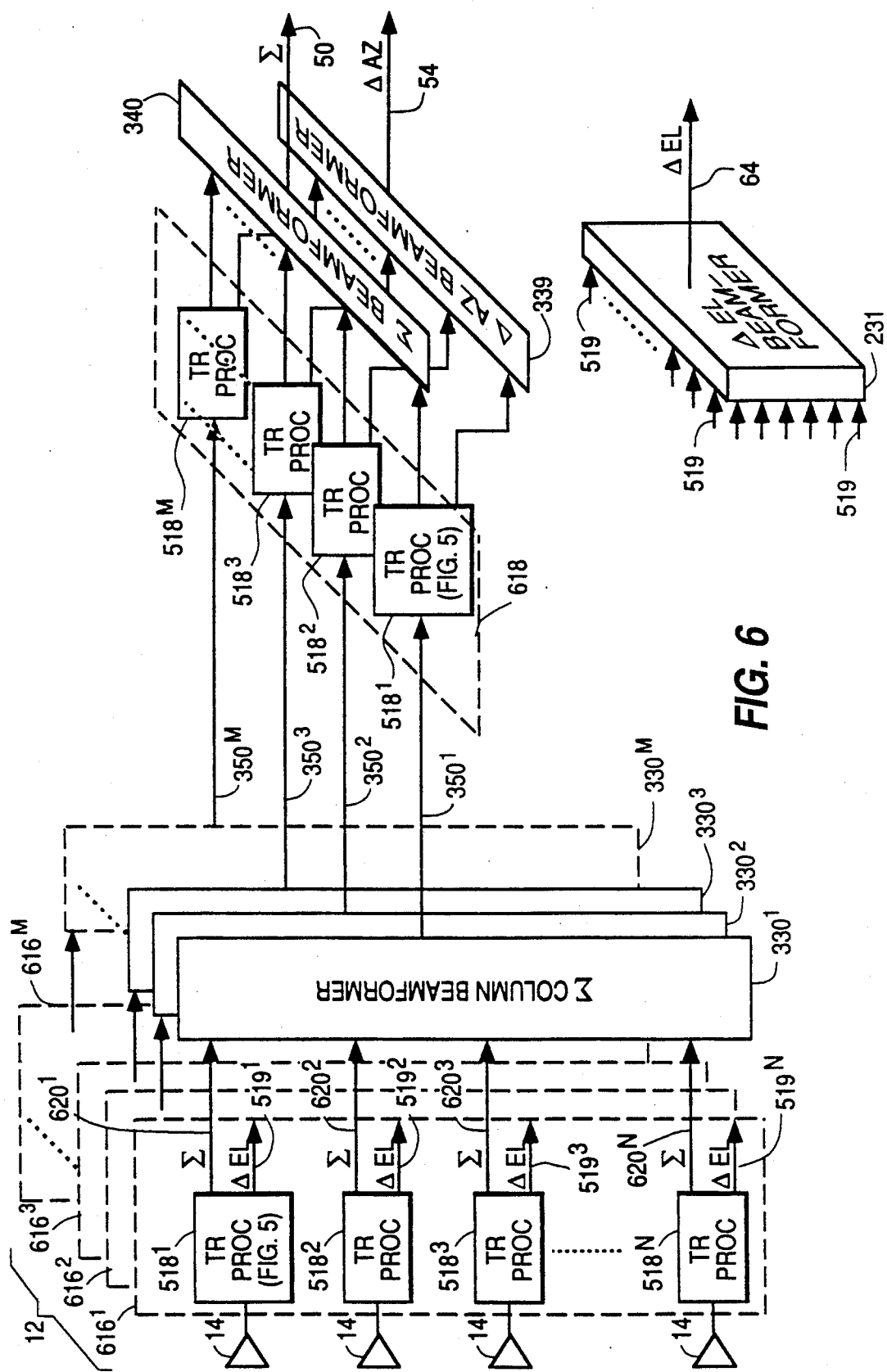
FIG. 6 is a simplified block diagram of a monopulse system according to another aspect of the invention, which uses TR modules such as that of FIG. 5.

FIG. 6 is a simplified block diagram of an array antenna using two-output TR Proc modules such as those of FIG. 5. Elements of FIG. 6 corresponding to those of other FIG. are designated by the same reference numerals. In FIG. 6, array 12 includes a plurality of elemental antennas 14, each coupled to the radiator port of an associated TR Proc 518, each of which is similar to that of FIG. 5. The TR Procs 518 are arranged in columns designated $616^1$, $616^2$...$616^M$. Each column includes N TR Procs 518. The R processors 518 of FIG. 6 differ from those of FIG. 3 in having only two outputs. The lowermost output 519 from each TR processor 518 is coupled to an elevation difference beamformer illustrated in FIG. 6 as 231. This beamformer is similar to beamformer 231 of FIG. 2a, which combines the Δ El signals from NxM TR Procs 518 to produce a combined Δ]E1 signal on a conductor 64, and may be implemented in the form illustrated in FIG. 3.

The uppermost or Σ outputs from each TR Proc $518^1$, $518^2$...$518^M$ of column $616^1$ of FIG. 6 are connected to inputs of a Σ column beamformer $330^1$, corresponding to a beamformer of FIG. 3. Beamformer $330^1$ combines the Σoutputs from the TR Procs of column $616^1$ and produces a combined signal on a cable $350^1$. The uppermost Σ outputs of the TR processors (not illustrated) of columns $616^2$, $616^3$...$616^M$ are each collected by a corresponding Σbeamformer $330^2$, $330^3$...$330^M$, to produce outputs on cables $350^2$, $350^3$...$350^M$. As so far described, the arrangement is generally similar to that of FIG. 3, but there is only a single output cable from each column Σ beamformer. These single cables carry signals from which both the Σ and Δ azimuth beams must be generated.

The desired pair of beams are generated from the signal on the single cables by applying the signals on cables $350^1$, $350^2$...$350^M$ of FIG. 6 to a further array 618 of TR Procs 518. As illustrated in FIG. 6, array 618 includes TR Procs $518^1$, $518^2$, $518^3$...$518^M$. TR Proc 518 of array 618 may be identical to TR Procs 518 of columns 616. Each TR Proc receives signals from a corresponding cable 350, for, in a receiving mode, dividing the signals into two portions and applying them to a sum beamformer 340 and to a Δ azimuth beamformer 339. This arrangement has the advantage of relative simplicity compared with the arrangement of FIG. 3, while maintaining the advantage of substantial control over the three antenna patterns.

Figure 7:
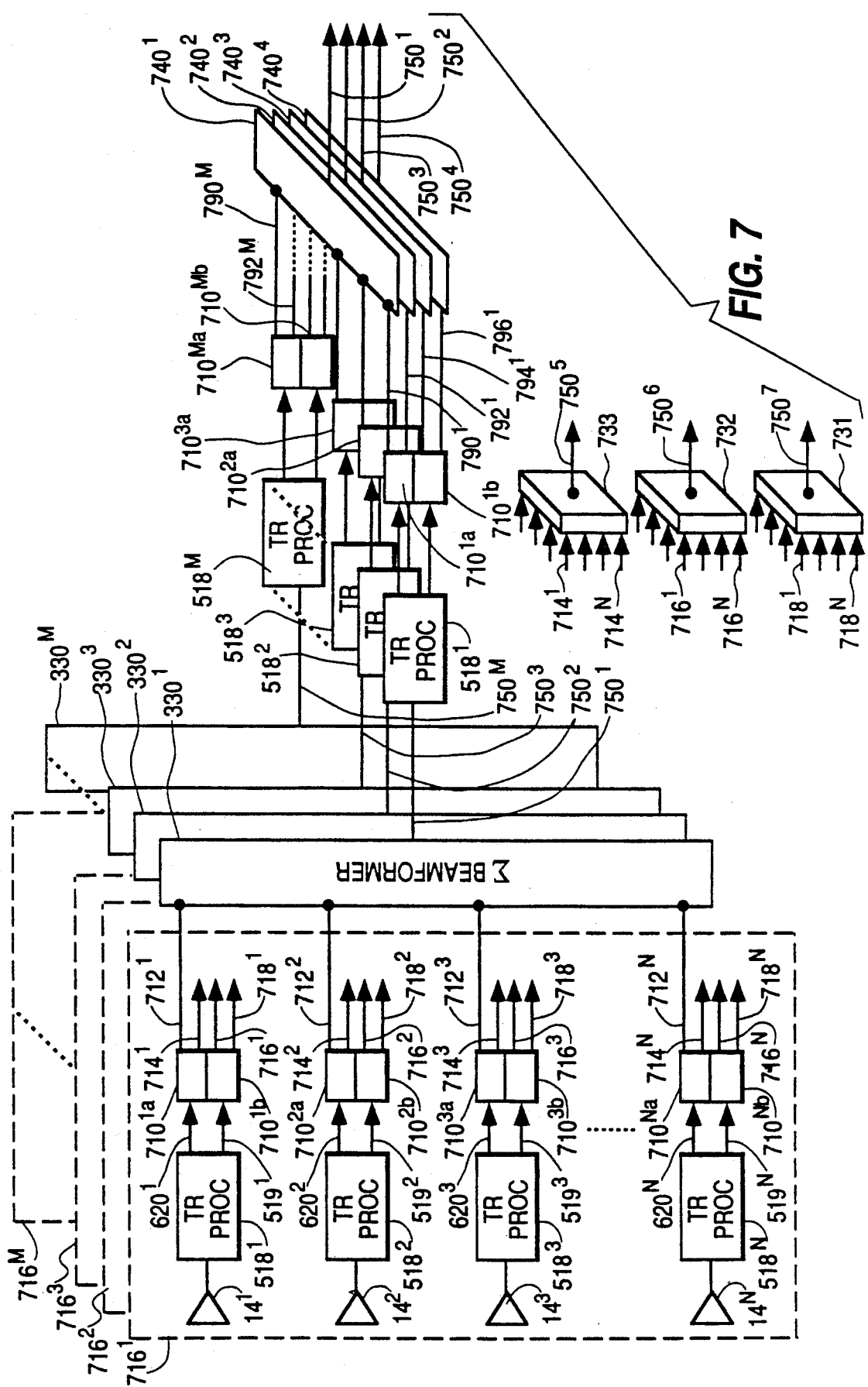
FIG. 7 is a simplified block diagram of another embodiment of the invention using TR modules such as that of FIG. 5 in conjunction with power dividers to generate plural antenna beams, in which the antenna beams are associated together in spaced-apart pairs which track together.

In FIG. 7, elements corresponding to those of other FIGURES are designated by the same reference numerals. The arrangement of FIG. 7 is generally similar to that of FIG. 6, but includes the use of power dividers for feeding pairs of beamformers in order to generate closely-spaced beam pairs which track with changes in a single phase shifter. The arrangement of FIG. 7 includes a plurality of vertical column arrays 716, each of which includes a plurality of elemental antennas 14, a like plurality of TR processors 518, and a pair of power dividers or splitters $710^A$, $710^B$ for each TR processor. Thus, each antenna 14 produces four output signals. For example, the first vertical column array $716^1$ of FIG. 7, which is the only array illustrated in any detail, includes antennas $14^1$, $14^2$, $14^3$...$14^N$. Taking antenna $14^1$ as being typical, it is connected to the input of a TR processor $518^1$. TR Proc $518^1$ is connected to a first output cable $620^1$ and a second output cable $519^1$. Cable $620^1$ is applied to the input of a power divider illustrated as a block $710^{1a}$, while cable $519^1$ is applied to a second power divider $710^{1b}$. Power divider $710^{1a}$ divides the signal received over its input cable $620^1$ into two portions, one of which is coupled onto a cable $712^1$, and another portion which is coupled onto a second cable $714^1$. Similarly, signal coupled into power divider $710^{1b}$ from cable $519^1$ is divided into two portions, the first of which is coupled on to a first cable $716^1$ and the second of which is coupled onto a second cable $718^1$. All the other connections within column array $716^1$ are similar and are not discussed in detail.

The three lower cables from each power divider set are individually coupled to three beamformers 731, 732 and 733. In particular, cable $714^1$ from power divider $710^{1a}$ is connected to a beamformer 733 by a path (not illustrated), and the cables 714 from all the other elements of each column array 716 are coupled separately to an input of beamformer 733. The output of beamformer 733 appears on a cable $750^5$. Similarly, all cables 716 from all power dividers $710^b$ are coupled to a beamformer 732, which has an output cable $750^6$, and all cables 718 from power dividers $710^b$ of all column arrays 716 are coupled to a further beamformer 731, which has an output cable $750^7$; It should be noted that the signal applied over cables 716 to beamformer 732 and those applied over cable 718 to beamformer 731 have the same amplitude and phase, since they are replicas of one another. According to the aspect of the invention, a relative progressive phase shift is provided to the inputs of one of beamformers 731 and 732 so as to slightly offset the beams which they generate. With these slight phase offsets, which may be provided by printed line length differences built into the beamformers, two separate beams are generated, which track together during beam steering under the control of a single one of the phase shifters within each of the TR processors 518 of the column arrays 716. Similarly, a relative progressive phase shift is provided between the inputs of beamformers 732 and 733, to generate yet another beam pair.

Output cables 712 of power dividers $710^a$ are separately connected to inputs of column sum beamformers illustrated as 330 in FIG. 7. Thus, cables $712^1$, $712^2$, $712^3$...$712^N$ of column $716^1$ are connected to separate inputs of sum beamformer $330^1$. Corresponding cables of column arrays $716^2$ are similarly coupled to a column beamformer $330^2$, etc. Each column beamformer $330^1$, $330^2$...$330^M$ sums the signals applied thereto and couples them onto a single output cable 750. For example sum beamformer $330^1$ sums signals onto a single cable $750^1$. The combined signal produced at each cable 750 is coupled to an input of an associated TR processor 518 of an array 718. Each TR processor of array 718 generates two output signals. Each array 718 also includes a further pair of power dividers $710^a$ and $710^b$ connected to the outputs of each TR processor. Thus, the combined signal produced on each cable 750 generates four outputs. Each power divider $710^a$ of array 718 produces an output on a first output cable 790 and on a second cable 792. For example, power divider $710^{1a}$ divides the signal applied to its input port into two portions, a first of which is coupled onto output cable $790^1$, and the other portion of which is coupled to output cable $792^1$. Similarly, the signals coupled into power divider $710^{1b}$ are divided into two portions, the first of which is coupled onto cable $794^1$, and a second of which is coupled onto cable $796^1$. All cables 790 are coupled separately to separate inputs of a first sum beamformer $740^1$, all cables 792 are coupled separately to separate inputs of a second sum beamformer $740^2$, all cables 794 are coupled separately to inputs of a further sum beamformer $740^3$, and all cables 796 are coupled separately to separate inputs of a beamformer $740^4$. Each beamformer 740 sums together its input signals and couples them to a single output cable. For example, sum beamformer $740^1$ couples its output on to a cable $750^1$, beamformer $740^2$ couples its output to cable $750^2$, sum beamformer $740^3$ couples its output on to a single cable $750^3$, and sum beamformer $740^4$ couples its output on to a single cable $750^4$.

In operation, beamformers $740^1$ and $740^2$ receive inputs which are common in amplitude and phase. Beamformers $740^1$ and $740^2$ are provided with a relative progressive phase shift of their inputs so that the beams which they form are angularly spaced by a small angle. Similarly, the inputs of beamformers $740^3$ and $740^4$ are provided with a relative phase shift so that they produce slightly different angular spacing of their beams. These angular spacings track during scanning, because the scanning is controlled by the same phase shifter of the phase shifters 518 of array 718 or of the arrays 716. It should also be noted that there may be a progressive phase shift between the inputs of all beamformers 740 and beamformers 731, 732 and 733.

FIG. 8 illustrates a beam pattern which might be generated by an arrangement such as that of FIG. 7. In FIG. 8, seven separate beams from outputs $750^1$, $750^2$, $750^3$, $750^4$, $750^5$, $750^6$ and $750^7$ are respectively represented by circles 810, 812, 814, 816, 818, 820 and 822. These circles may be considered, for example, to represent a plot of the 1.0 dB beamwidth points of the antenna pattern. As illustrated in FIG. 8, adjacent pairs of circles, or beams, are considered to scan together, with the central position of each pair being separately steered.

Various forms of signal processing may be performed on the formed beams for noise reduction, target enhancement and the like, before display. Such signal processing is beyond the scope of the invention, and is not described further.

Other embodiments of the invention will be apparent to those skilled in the art. For example, beamformers 231 in FIG. 6 and/or 731, 732 and/or 733 in FIG. 7 can be designed like those in FIG. 3, where some of the combining is done within the array columns and the balance is done with a one dimensional horizontal beamformer for each of the desired beams. As another example, arrays of antennas may have shapes which are other than rectangular, as for example circular, in which case it may be desirable to interpret the terms "column" and "row", as used hereinbefore, as "ring" and "radial", respectively, while other shapes may require other interpretations. It should be noted that even circular arrays may have the elemental antennas arranged in rows and columns. The transmission lines interconnecting the various portions of the described system may be formed as coaxial cables, or as printed circuit transmission lines, or as waveguides, or as separate conductors, depending upon the application. Parallel digital signals may be carried by multiconductor transmission lines, all in known fashion. While TR processors 518 of array 618 of FIG. 6 or array 718 of FIG. 7 have been described as being identical to TR processors 518 of column arrays 616 of FIG. 6 or 716 of FIG. 7, they need not be totally identical, specifically in terms of gain and output power.

What is claimed is:

1. a transmit-receive processor adapted for use together with other similar processors in a monopulse radar system, which monopulse radar system includes a plurality of arrayed radiators, and which also includes an azimuth sum channel combiner defining a combined port and plural separated ports, and at least one of an azimuth difference channel combiner and an elevation difference channel combiner, each of which also includes a combined port and plural separated ports, said combined port of said sum channel combiner being adapted for receiving a transmitter signal during a transmit mode of operation, said processor comprising:

transmit amplifying means including an input port and an output port, for amplifying signals to be transmitted by one of said radiators;

receive amplifying menas including an input port and an output port, for amplifying signals received by said one of said radiators;

radiator coupling means coupled to said output port of said transmit amplifying means, to said input port of said receive amplifying menas, and adapted to be coupled to said one of said radiators, for coupling said signals to be transmitted to said one of said radiators from said transmit amplifying means, and for coupling said signals received by said one of said radiators to said receive amplifying means;

first and second phase shifting means for phase shifting signals passing therethrough;

controllable switch means coupled to said first phase shifting means, and including a first port adapted to be coupled to one of said separated ports of said azimuth sum channel combiner, a second port coupled to said input port of said transmit amplifying means, and a third port, said controllable switch means being for, in a transmit mode, coupling signals to be transmitted by way of said first phase shifting means to said transmit amplifying means, and for, in a receive mode, coupling signals applied to said third port through said first phase shifting means to said first port, whereby transmitted signals and received signals applied to said azimuth sum channel combiner traverse the same phase correction network; and receive coupling means coupled to said output port of said receive amplifying means, to said third port of said switch means, to said second phase shifting menas, and adapted to be coupled to one of said separated ports of one of said azimuth difference channel combiner and said elevation difference channel combiner, for dividing the amplified received signal produced at said output port of said receive amplifying menas into at least first and second portions, and for coupling said first portion of said amplified received signal to said third port of said switch means, said receive coupling means also being adapted for coupling said second portion of said amplified received signal to said one of said distal ports of said one of the azimuth difference channel combiner and said elevation difference channel combiner by way of said second phase shifting means.

2. A processor according to claim 1 wherein said receive coupling means divides said amplified received signal into said first and second portions, and also into a third portion, and wherein said receive coupling means is also adapted for coupling said third portion of said amplified received signal to one of said distal ports of the other one of said azimuth difference channel combiner and said elevation difference channel combiner by way of third phase shifting means.

3. A radar system; comprising
an array of transmit-receive antennas arranged in rows and columns;

means for beamforming, said means for beamforming including at least one of azimuth and elevation difference beamforming means, said one of said difference beamforming means including plural separated ports, one of said separated ports of said beamforming means being associated with each one of said antennas;

a plurality of transmit-receive processors, each associated with one of said intervals, each of said processors also including transmit amplifying means including an input port and an output port, for amplifying signals to be transmitted by the associated one of the said antennas, said processor also including receive amplifying menas including an input port and an output port, for amplifying signals recevied by said associated antenna, each of said processors also including:

antenna coupling means coupled to said output port of said transmit amplifying means, to said input port of said receive amplifying means, and to said associated antenna, for coupling said signals to be transmitted to said associated antenna from said transmit amplifying means, and for coupling said signals received by said associated antenna to said receive amplifying means;

each of said processors also including first and second phase shifting means for phase shifting signals passing therethrough;

each of said processors also including controllable switch means coupled to said first phase shifting means, to an associated one of said separated ports of said sum beamforming means, and to an input port of said transmit amplifying means, said controllable switch means also including a first port, said controllable switch means being for, in a transmit mode, coupling said signals to be transmitted from said associated one of said separated ports of said sum beamforming means, by way of said first phase shifting means, to said transmit amplifying means, and for, in a receive mode, coupling signals which are applied to said first port of said controllable switch means to said associated one of said separated ports of said sum beamforming means by way of said first phase shifting means, whereby transmitted and received signals applied to said sum beamforming means traverse the same phase correction network;

each of said processors further including receive signal coupling means coupled to said output port of said receive amplifying means, to said first port of said switch means, to said second phase shifting means, and to an associated one of said separated ports of said one of said difference produced at said output port of said receive amplifying means into at least first and second portions, and for coupling said first portion of said amplified received signal to said first port of said switch means, and for coupling said second portion of said amplified received signal to said associated separated port of said difference beamforming means by way of said second phase shifting means.

4. A radar system according to claim 3, wherein said sum beamforming means further includes a combined port adapted for receiving transmitter signal during a transmit mode of operation.

* * * * *

UNITED STATES PATENT AND TRADEMARK OFFICE
CERTIFICATE OF CORRECTION

PATENT NO. : 5,017,927

DATED : May 21, 1991

INVENTOR(S) : Ashok K. Agrawal et al.

It is certified that error appears in the above-identified patent and that said Letters Patent is hereby corrected as shown below:

Column 1, line 17, after "pared" insert a period.

Column 1, line 61, "$124^N$" should be --$14^N$--.

Column 1, line 66, "$16^N$" should be --$16^M$--.

Column 2, line 1, "$14^{22}$" should be --$14^2$--.

Column 2, line 15, "$20^{N-1}$. Phase shifter $18^2$" should be --$20^{N-1}$. Phase shifter $18^2$--.

Column 2, line 23, "$20^{N-2},,$" should be --$20^{N-2},$--.

Column 2, line 32, "$16^N$" should be --$16^M$--.

Column 2, line 37, "$16^N$" should be --$16^M$--.

Column 2, line 39, "$24^N$" should be --$24^M$--.

Column 2, line 55, "the a output" should be --the $\Delta$ output--.

Column 2, line 61, "the '" should be --the $\Delta$--.

Column 3, line 20, "$34^{N-1}$" should be --$34^{M-1}$--.

Column 3, line 48, "381" should be --$38^1$--.

Column 6, line 42 after "columns" insert a period.

Column 6, line 59, "216" should be --$216^1$--.

Column 6, line 68, "$220^2$" should be --$220^3$--.

Column 7, line 16, "$329^{1-329M}$" should be --$329^1 - 329^M$--.

UNITED STATES PATENT AND TRADEMARK OFFICE
CERTIFICATE OF CORRECTION

PATENT NO. : 5,017,927

DATED : May 21, 1991

INVENTOR(S) : Ashok K. Agrawal et al.

It is certified that error appears in the above-identified patent and that said Letters Patent is hereby corrected as shown below:

Column 8, line 67, after "combiner" insert a period.

Column 10, line 6, after "therefor" insert a period.

Column 10, line 10, "se" should be --use--.

Column 10, line 30, "FIG." should be --FIGS.--.

Column 10, line 43, "$\Delta]E1$" should be --$\Delta E1$--.

Column 11, line 65 "$710^8$" should be --$710^a$--.

Column 13, line 41, "menas" should be --means--.

Column 14, line 6, "menas" should be --means--.

Column 14, line 11, "menas" should be --means--.

Column 14, line 41, "intervals" should be --antennas--.

Column 14, line 46, "menas" should be --means--.

Column 16, line 2, after "difference" insert --beamforming means, for dividing amplified received signal--.

Signed and Sealed this

Twenty-second Day of September, 1992

Attest:

DOUGLAS B. COMER

Attesting Officer      Acting Commissioner of Patents and Trademarks